March 19, 1929. J. C. CARTER 1,706,107

PROCESS FOR PRODUCING PHOTOGRAPHIC COLOR PRINTS AND TRANSPARENCIES

Filed Jan. 8, 1927

Inventor:
Joseph C. Carter;
by William R. Pratt
his Attorney.

Patented Mar. 19, 1929.

1,706,107

UNITED STATES PATENT OFFICE.

JOSEPH C. CARTER, OF WASHINGTON, DISTRICT OF COLUMBIA.

PROCESS FOR PRODUCING PHOTOGRAPHIC COLOR PRINTS AND TRANSPARENCIES.

Application filed January 8, 1927. Serial No. 160,000.

This invention relates to a new process for producing photographic color prints or transparencies by the use of collodion emulsion plates either wet or dry. Similar methods have been previously used with gelatine or similar bases but these have been found open to many objections. In the use of gelatine bases an elaborate apparatus is necessary and the drying employs much time so that the execution of the process takes a prolonged period of time. Also a prolonged washing is necessary to eliminate free chemicals which would be highly objectionable in the subsequent treatment. The treatment of gelatine films with various chemicals solutions for toning, fixing, etc., is very likely to cause reticulation or frilling, and the gelatine is very apt to stretch on being removed from the glass, thus making registration of the various color elements difficult or impossible.

In making the plates the support may first be coated with albumen, and the collodion emulsion then flowed upon this prepared surface. By the use of the collodion emulsion plates all of these disadvantages are obviated. They can be washed free of chemicals in a short space of time and are ready for use with very slight treatment. They are easily stripped and assembled and can be applied to any desired base such as paper, cloth, glass or other desired medium. There is no danger of reticulation or frilling and the registry is easy on account of freedom from stretching. Better results in other ways are also obtained.

Figure 1:
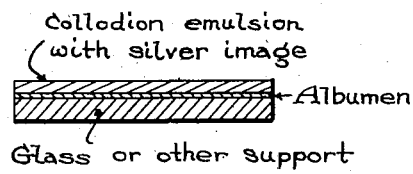
Figure 2:
Figure 3:
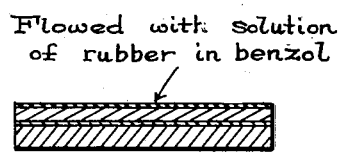
Figure 4:
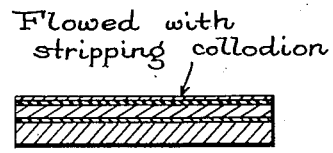
Figure 6:
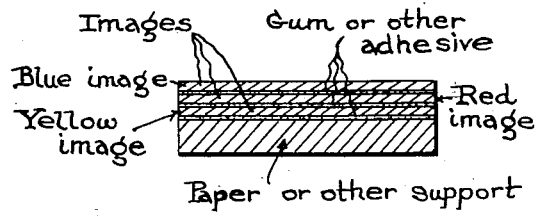
Figure 5:
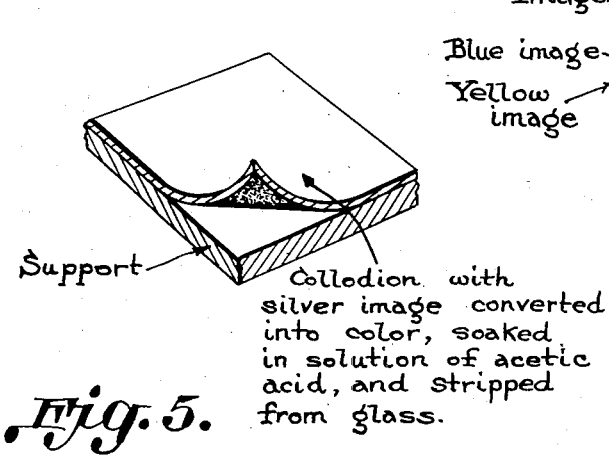

The drawings disclose graphically the various steps of the process, and Figure 1 shows the first step in the production of a single print. Figure 2 shows the second step, in which the silver image is converted into a color image; Figure 3 shows the next stage, which involves the use of a solution of rubber in benzol; Figure 4 shows the plate flowed with stripping collodion; Figure 5 discloses the collodion print being stripped from the glass after soaking in acetic acid; and Figure 6 discloses the manner of building up the superposed color plates to form the final color print.

The invention may be used for two, three or four color work. If two colors are employed, complementary colors, such as red and green, blue and orange, etc., are employed. For three color work, the usual yellow, blue and red are used, and the addition of a gray key plate permits four color work to be readily done.

Color separation negatives are made one at a time, properly screened, by an ordinary stand camera or by any of the numerous color cameras. Positives are then made on collodion emulsion plates (wet or dry) or on wet plates, in the usual manner of making positives.

These positives are then converted into color positives and this may be done in various ways. The positives are first bleached with a solution of potassium ferricyanide and copper sulphate and immediately dyed, or may be dried and dyed at a later period. Instead of this, there may be employed the Traube method of converting the silver image in these positives into silver iodide, or other well known methods may be employed for converting the silver image into one which is a mordant for the desired dye. After dyeing, the silver or mordanting image may be removed by fixing in sodium thiosulphate (hypo) to leave a clear dye image. Instead of dyeing, two of the plates in three color work, namely, the yellow and the blue, may be made by chemical toning, or all three color plates may be chemically toned.

In producing the yellow plate, the following procedure may be employed. The plate is first bleached in a solution composed of lead nitrate and potassium ferricyanide, after which it is washed and treated with a solution of potassium chromate or ammonium bichromate. This causes a deposit of chrome yellow on the silver image.

The blue plate may be toned by any of the numerous iron toners. The plate may be bleached in a solution of potassium ferricyanide and after washing immersed in a solution of ferric ammonium sulphate. The plate is then placed in a fixing solution of sodium thiosulphate (hypo) and the transparent blue image is formed.

The red plate may be obtained by any of the usual dye mordanting methods which are well known, or the toning be produced by chemicals.

Before stripping the plates it is advisable to strengthen the collodion image by flowing it first with a solution of rubber in benzol and then flowing it with stripping collodion. This prevents the images from stretching and builds them up to a strength which enables them to be easily handled.

In three color work, the plates are assembled in the following manner. The yellow plate, being opaque, should preferably be the base and have the other two superposed thereon. The yellow plate is cut close to the margin of the support and immersed in a strong solution of acetic acid and water. This attacks a substratum of albumen with which the support may have been coated before being flowed with the collodion emulsion, or in the case of wet plates, with the plain or chemically treated collodion. After washing in water the yellow image is readily removed from its support and can then be laid on an suitable medium for backing depending upon the desired result.

The other two prints are then similarly treated and superposed on the yellow print, and an adhesive, such a gelatine, may be used between the various constituent images.

It is general practice to add the red print second since the color of the last print predominates to a slight extent and the blue is less objectionable in this regard than is the red.

It is obvious that a wide variation of the precise manner of producing the color positives is permissible without departing in any way from the spirit of the invention, and that other details may be modified in accordance with the precise result desired. The invention is therefore to be regarded as limited only by the scope of the appended claims.

I claim as my invention:

1. A process for producing photographic color prints which comprises taking color separation negatives, forming positives therefrom on collodion emulsion plates, transforming said positives into desired color positives, stripping the prints from their supports, and superposing the prints to form the color prints.

2. A process for producing photographic color prints which comprises taking color separation negatives, forming positives therefrom on collodion emulsion plates, transforming said positives into desired color positives, washing said color positives in acetic acid and water, stripping the prints from their supports, and superposing the prints to form the color prints.

3. A process for producing photographic color prints which comprises taking color separation negatives, forming positives therefrom on collodion emulsion plates, transforming said positives into desired color positives, flowing the prints with a strengthening solution, stripping the prints from their supports, and superposing the prints to form the color print.

4. A process for producing photographic color prints which comprises taking color separation negatives, forming positives therefrom on collodion emulsion plates, transforming said positives into desired color positives, flowing the prints with a solution of rubber in benzol and then with stripping collodion to strengthen the same, stripping the prints from their supports, and superposing the prints to form the color print.

5. A process for producing photographic color prints which comprises taking color separation negatives, forming positives therefrom on collodion emulsion plates, treating each positive in a suitable manner to transform it into the desired color positive, stripping the prints from their supports, and superposing the prints to form the color print.

6. A process for producing photographic color prints which comprises taking color separation negatives, forming positives therefrom on collodion plates, transforming said positives into desired color positives, stripping the prints from their supports, and superposing the prints to form color prints.

7. A process for producing photographic color prints which comprises taking color separation negatives, forming positives therefrom on collodion plates, transforming said positives into desired color positives, stripping the prints from their supports, and superposing the prints to form transparencies.

In testimony whereof I affix my signature.

JOSEPH C. CARTER.